United States Patent
Li et al.

(10) Patent No.: US 12,327,846 B2
(45) Date of Patent: Jun. 10, 2025

(54) SELF-HEATING CONTROL CIRCUIT AND SYSTEM

(71) Applicant: CONTEMPORARY AMPEREX TECHNOLOGY (HONG KONG) LIMITED, Hong Kong (CN)

(72) Inventors: Zhanliang Li, Ningde (CN); Yuanmiao Zhao, Ningde (CN); Xinwei Chen, Ningde (CN); Xiaojian Huang, Ningde (CN); Yu Yan, Ningde (CN); Zhimin Dan, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 123 days.

(21) Appl. No.: 18/172,535

(22) Filed: Feb. 22, 2023

(65) Prior Publication Data

US 2023/0198282 A1 Jun. 22, 2023

Related U.S. Application Data

(63) Continuation of application No. PCT/CN2022/094652, filed on May 24, 2022.

(30) Foreign Application Priority Data

Oct. 29, 2021 (CN) .......................... 202122629084.3

(51) Int. Cl.
*B60L 58/27* (2019.01)
*H01M 10/44* (2006.01)
(Continued)

(52) U.S. Cl.
CPC ........... *H01M 10/443* (2013.01); *B60L 58/27* (2019.02); *H01M 10/615* (2015.04);
(Continued)

(58) Field of Classification Search
CPC .. H01M 10/443; H01M 10/615; H02J 7/0013; H02J 7/007194; H02J 7/342; B60L 58/27
(Continued)

(56) References Cited

U.S. PATENT DOCUMENTS 2,442,380 A * 6/1948 Schrodt ............... H01M 10/637
429/50
2,710,937 A * 6/1955 Godshalk ............ H01M 10/615
429/120

(Continued)

FOREIGN PATENT DOCUMENTS

| CN | 102405553 A | 4/2012 |
| CN | 208774575 U | 4/2019 |

(Continued)

OTHER PUBLICATIONS

The World Intellectual Property Organization (WIPO) International Search Report for PCT/CN2022/094652 Aug. 3, 2022 6 pages (including translation).

(Continued)

*Primary Examiner* — John T Trischler
(74) *Attorney, Agent, or Firm* — ANOVA LAW GROUP, PLLC

(57) ABSTRACT

A self-heating control circuit includes a control module configured to obtain a cell temperature of each of two battery packs connected in parallel and send a trigger signal in response to the cell temperature being lower than a threshold. The two battery packs include a first battery pack and a second battery pack. The control circuit further includes a switch module disposed at a charging and discharging circuit of the first battery pack. A control terminal of the switch module is connected to the control module and is configured to cut off the charging and discharging circuit upon reception of the trigger signal. The control circuit also includes an excitation module configured to form a path with the two (Continued)

battery packs upon cut-off of the charging and discharging circuit, and generate an excitation current, so that the excitation current flows back and forth between the two battery packs.

12 Claims, 4 Drawing Sheets

(51) Int. Cl.
| | |
|---|---|
| *H01M 10/615* | (2014.01) |
| *H02J 7/00* | (2006.01) |
| *H02J 7/34* | (2006.01) |
| *B60L 58/21* | (2019.01) |
| *H01M 10/42* | (2006.01) |
| *H01M 10/637* | (2014.01) |
| *H05B 3/00* | (2006.01) |

(52) U.S. Cl.
CPC ...... *H02J 7/0013* (2013.01); *H02J 7/007194* (2020.01); *H02J 7/342* (2020.01); *B60L 58/21* (2019.02); *B60L 2240/545* (2013.01); *H01M 2010/4271* (2013.01); *H01M 10/637* (2015.04); *H02J 7/0069* (2020.01); *H05B 3/0023* (2013.01)

(58) Field of Classification Search
USPC .................................................. 320/103, 150
See application file for complete search history.

(56) References Cited

U.S. PATENT DOCUMENTS

| | | | | |
|---|---|---|---|---|
| 5,990,661 | A | 11/1999 | Ashtiani et al. | |
| 8,452,490 | B2* | 5/2013 | Lakirovich | B60L 1/08 320/108 |
| 8,593,112 | B2* | 11/2013 | An | H01M 10/42 320/135 |
| 9,018,909 | B2* | 4/2015 | Kimura | B60L 58/27 320/128 |
| 9,187,000 | B2* | 11/2015 | Kuwano | H02J 7/0019 |
| 9,479,002 | B2* | 10/2016 | An | H02J 7/0068 |
| 10,547,181 | B2* | 1/2020 | Maruyama | H02J 7/0013 |
| 10,957,950 | B1* | 3/2021 | Hou | H02J 7/0048 |
| 11,021,064 | B2* | 6/2021 | Dan | B60L 3/0069 |
| 11,139,514 | B2* | 10/2021 | Zuo | B60L 58/27 |
| 11,215,156 | B2* | 1/2022 | Ciaccio | H02J 7/342 |
| 11,258,288 | B2* | 2/2022 | Kirchner | H02J 7/345 |
| 11,276,887 | B2* | 3/2022 | Umemura | H01M 10/425 |
| 11,349,162 | B2* | 5/2022 | Ge | H01M 10/486 |
| 11,466,656 | B2* | 10/2022 | Ciaccio | B60L 1/02 |
| 11,609,274 | B2* | 3/2023 | Zhang | H02J 7/00711 |
| 11,710,860 | B2* | 7/2023 | Nakano | H01M 10/48 320/134 |
| 11,876,160 | B2* | 1/2024 | Chen | H01M 10/63 |
| 2011/0101921 | A1* | 5/2011 | An | H01M 10/44 320/128 |
| 2011/0144861 | A1 | 6/2011 | Lakirovich et al. | |
| 2011/0309070 | A1* | 12/2011 | Butzmann | B60L 58/27 219/661 |
| 2012/0242291 | A1* | 9/2012 | Kimura | B60L 50/64 320/126 |
| 2014/0035534 | A1* | 2/2014 | An | H01M 10/44 320/134 |
| 2014/0077731 | A1* | 3/2014 | Kuwano | H02J 7/0014 320/126 |
| 2018/0252195 | A1* | 9/2018 | Ciaccio | H01M 10/635 |
| 2018/0252774 | A1* | 9/2018 | Ciaccio | G01R 31/388 |
| 2019/0044348 | A1* | 2/2019 | Maruyama | H02J 7/007192 |
| 2019/0359061 | A1* | 11/2019 | Dan | H01M 10/615 |
| 2020/0119409 | A1* | 4/2020 | Umemura | H02J 7/0048 |
| 2020/0127339 | A1* | 4/2020 | Nakano | H02J 7/0045 |
| 2020/0259353 | A1 | 8/2020 | Kirchner et al. | |
| 2021/0075073 | A1* | 3/2021 | Hou | H02J 7/007194 |
| 2021/0218085 | A1* | 7/2021 | Ge | H01M 10/486 |
| 2021/0249707 | A1* | 8/2021 | Zuo | H01M 10/637 |
| 2021/0351684 | A1* | 11/2021 | Nishimura | H02M 3/158 |
| 2023/0015814 | A1* | 1/2023 | Zhang | B60L 58/16 |
| 2023/0146978 | A1* | 5/2023 | Chen | H01M 10/647 |
| 2023/0231224 | A1* | 7/2023 | Wang | H01M 10/482 429/120 |
| 2023/0299606 | A1* | 9/2023 | Zuo | H02J 7/007182 320/137 |
| 2023/0318055 | A1* | 10/2023 | Nakano | H01M 10/48 320/134 |
| 2023/0395890 | A1* | 12/2023 | Zhao | H01M 10/425 |
| 2024/0039058 | A1* | 2/2024 | Ye | H02J 7/00034 |
| 2024/0178690 | A1* | 5/2024 | Huang | H01M 10/615 |
| 2024/0258591 | A1* | 8/2024 | Tuo | H01M 10/4264 |

FOREIGN PATENT DOCUMENTS

| | | | |
|---|---|---|---|
| CN | 110165334 | A | 8/2019 |
| CN | 212373187 | U | 1/2021 |
| CN | 212587580 | U | 2/2021 |
| CN | 216354438 | U | 4/2022 |
| JP | 2013037785 | A | 2/2013 |
| JP | 2013089296 | A | 5/2013 |
| JP | 2015133776 | A | 7/2015 |
| WO | WO-2023226567 A1 * | 11/2023 | ............ H02J 7/0068 |

OTHER PUBLICATIONS

The European Patent Office (EPO) The Extended European Search Report for Application No. 22760636.5 Feb. 20, 2023 7 Pages.
The Japan Patent Office (JPO) Decision to Grant a Patent for Application No. 2022-554613 Dec. 18, 2023 6 Pages(including translation).

* cited by examiner

SELF-HEATING CONTROL CIRCUIT AND SYSTEM

CROSS-REFERENCE TO RELATED APPLICATIONS

The present application is a continuation of International Application No. PCT/CN2022/094652, filed on May 24, 2022, which claims priority to Chinese Patent Application No. 202122629084.3, entitled "SELF-HEATING CONTROL CIRCUIT AND SYSTEM", and filed on Oct. 29, 2021, the entire contents of both of which are incorporated herein by reference.

TECHNICAL FIELD

The present application relates to the technical field of batteries, and in particular, to a self-heating control circuit and system.

BACKGROUND ART

In recent years, new energy vehicles have made considerable progress around the world for their advantages such as a high energy conversion rate, a comfortable driving experience and zero emissions of greenhouse gases. However, when a new energy vehicle is in a low temperature environment, heating of a traction battery in the vehicle is needed. At present, the related art mainly involves connecting a battery to a heating apparatus to implement heat transfer and then heating the battery. However, this method consumes much energy for heating.

SUMMARY

Embodiments of the present application are intended to provide a self-heating control circuit and system, in order to provide a battery heating method with low energy consumed for heating.

In a first aspect, an embodiment of the present application provides a self-heating control circuit. The self-heating control circuit includes:
  a control module configured to obtain a cell temperature of each of two battery packs connected in parallel, and send a trigger signal when the cell temperature is lower than a threshold;
  a first switch module disposed at a charging and discharging circuit of a first battery pack, where a control terminal of the first switch module is connected to the control module, and is configured to cut off the charging and discharging circuit upon reception of the trigger signal, and the battery packs include the first battery pack; and
  an excitation module configured to form a path with the two battery packs upon cut-off of the charging and discharging circuit, and generate an excitation current, so that the excitation current flows back and forth between the two battery packs.

In this way, when the cell temperature is lower than the threshold, there is current flow between the two battery packs, so that heat is generated inside the battery packs, thereby implementing self-heating. Compared with a traditional external heating method for heat transfer, the self-heating method consumes low energy for heating, and therefore, a battery heating method with low energy consumed for heating is provided.

The internal self-heating method requires low energy, and thus also reduces the impact of a battery heating technique on a charging time and a battery life. Under a same temperature condition, the battery self-heating solution has an improved battery life and a shorter charging time compared with the related art, and requires no improvement in the interior of the battery packs, thereby reducing costs, and being simple and convenient to operate.

Optionally, the battery packs further include a second battery pack; and the first switch module includes:
  a first relay, a first terminal of which is connected to a first pole of the first battery pack, a second terminal of which is connected to a first pole of the second battery pack, and a control terminal of which is connected to the control module.

The provision of the first relay provides an optional structure of the first switch module, which facilitates changing the state of the charging and discharging circuit in a timely manner in the case of an excessively low cell temperature, in preparation for the excitation module to promote self-heating of the battery packs.

Optionally, a first terminal of the excitation module is connected to the first terminal of the first relay, a second terminal of the excitation module is connected to the second terminal of the first relay, and a third terminal of the excitation module is connected to a second pole of the first battery pack.

In these examples, a connecting structure of coordinating the first relay with the excitation module shows how the two battery packs connected in parallel are turned from a normal charging and discharging state to a state of forming the path with the excitation module, which provides a hardware basis for the excitation module to promote self-heating of the battery packs.

Optionally, the excitation module includes an energy storage unit, a first switching unit connected to the first pole of the first battery pack, a second switching unit connected to the first pole of the second battery pack, and a third switching unit and a fourth switching unit that are both connected to the second pole of the first battery pack;
  the energy storage unit is connected to a common terminal of the first switching unit and the third switching unit and to a common terminal of the second switching unit and the fourth switching unit; and
  control terminals of the first switching unit, the second switching unit, the third switching unit and the fourth switching unit are all connected to the control module, and ON timings of the first switching unit and the fourth switching unit are not the same as ON timings of the second switching unit and the third switching unit.

In this embodiment, the structural composition of the excitation module is provided, and in conjunction with the timing control of the four switching units by the control module, an oscillating excitation current is generated inside the excitation module. The excitation module is simple in structure, facilitates implementing self-heating of the battery packs with significantly reduced heat loss, has a high heating efficiency of the battery pack, and presents a good compatibility performance without the need to change the internal structure of the battery pack.

Optionally, the energy storage unit is an inductor or a capacitor.

Optionally, the first switching unit, the second switching unit, the third switching unit and the fourth switching unit are one of an MOS transistor and an insulated gate bipolar transistor.

Optionally, the self-heating control circuit further includes a first housing, and the control module, the first switch module and the excitation module are accommodated in the first housing.

The provision of the first housing can prevent the internal circuit from suffering external interference and facilitate circuit integration.

In a second aspect, an embodiment of the present application provides a self-heating control system. The self-heating control system includes:

two battery packs connected in parallel;

and a self-heating control circuit in the first aspect.

Optionally, the self-heating control system further includes a high voltage control circuit; the high voltage control circuit includes a first interface, a power supply interface, a charging interface and a second switch module;

the second switch module is connected to a common terminal of the two battery packs via the first interface, to a power consuming apparatus via the power supply interface, and to a charging apparatus via the charging interface;

the second switch module is configured to control the two battery packs to form a discharging circuit with the power consuming apparatus upon reception of a power supply signal via the power supply interface;

the second switch module is further configured to control the two battery packs to form a charging circuit with the charging apparatus upon reception of a charging signal via the charging interface; and the second switch module is further configured to control the charging circuit and the discharging circuit to be switched off upon reception of a trigger signal.

In this embodiment, the second switch module can be used to receive different signals, namely, the power supply signal, the charging signal, and the trigger signal, and ON/OFF control can be used to allow for switching-on of the circuit between the battery packs and a different apparatus/module, thereby implementing high-voltage power transfer.

Optionally, each of the battery packs includes a plurality of cells connected in series and a first service switch connected in series between the cells.

Therefore, a high-voltage main circuit of one battery pack may be manually cut off, thereby implementing independent operation of another battery pack. The provision of the first service switch can provide safety protection for maintenance personnel.

In the embodiments of the present application, when the cell temperature of the battery pack is lower than a threshold, the first switch module is triggered to cut off the charging and discharging circuit of the first battery pack, so that a path is formed between the excitation module and the two battery packs. In this case, the excitation module generates an excitation current, so that the excitation current flows back and forth between the battery packs. In this way, when the cell temperature is lower than the threshold, there is current flow between the two battery packs, so that heat is generated in the battery packs, thereby implementing self-heating. Compared with a traditional external heating method for heat transfer, the self-heating method consumes low energy for heating, and therefore, a battery heating method with low energy consumed for heating is provided.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without any creative effort.

Figure 1:
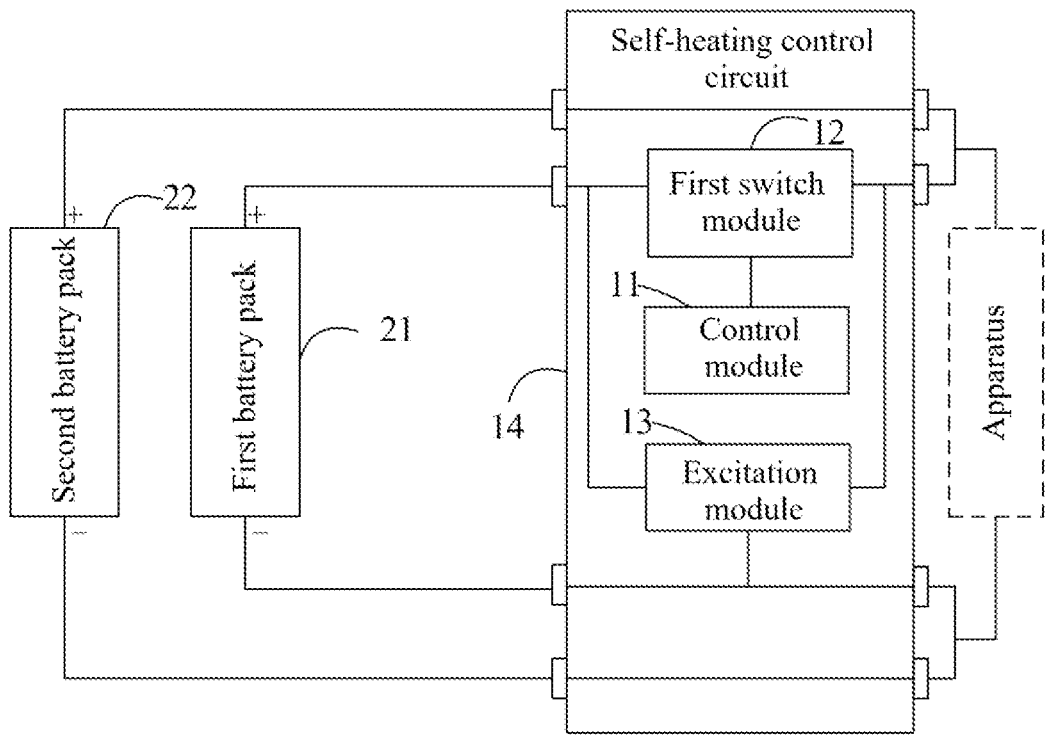
FIG. 1 is a structural block diagram of a self-heating control circuit according to an embodiment of the present application.

In the drawings, the drawings are not drawn to actual scale.

List of reference numerals: Control module 11, First switch module 12, Excitation module 13, First housing 14, First battery pack 21, Second battery pack 22, Cell 23, First service switch 24, First relay K1, Second relay K2, Third relay K3, Fourth relay K4, Fifth relay K5, Sixth relay K6, First switching unit Q1, Second switching unit Q2, Third switching unit Q3, Fourth switching unit Q4, Energy storage unit L, Pre-charging component R, High voltage control circuit 31, Second switch module 32, First interface 33, Power supply interface 34, Charging interface 35, Current sensor 36, Second service switch 37, Second housing 38, First positive interface 41, Second positive interface 42, First negative interface 43, Second negative interface 44, Third positive interface 45, Fourth positive interface 46, Third negative interface 47, and Fourth negative interface 48.

DETAILED DESCRIPTION OF EMBODIMENTS

The following further describes in detail implementations of the present application with reference to the accompanying drawings and embodiments. The detailed description of the following embodiments and the drawings are used to illustrate the principle of the present application by way of example, but shall not be used to limit the scope of the present application. In other words, the present application is not limited to the described embodiments.

In the description of the present application, it should be noted that, unless otherwise specified, "a plurality of" means at least two. An orientation or a position relationship indicated by the terms "upper", "lower", "left", "right", "inner", "outer", etc. is merely for convenient and brief description of the present application, rather than indicating or implying that an indicated apparatus or element needs to have a particular orientation or be constructed and operated in a particular orientation, and therefore cannot be construed as limiting the present application. In addition, the terms "first", "second", "third", etc. are merely for the purpose of description, and shall not be construed as indicating or implying relative importance. "Perpendicular" is not necessarily perpendicular in the strict sense, and a range of errors is allowed. "Parallel" is not necessarily parallel in the strict sense, and a range of errors is allowed.

The orientation terms in the following description all indicate directions shown in the drawings, and do not impose a limitation on a specific structure in the present application. In the description of the present application, it should also be noted that, the term "mount", "engage", and "connect" should be interpreted in the broad sense unless explicitly defined and limited otherwise, which, for example, may mean a fixed connection, a detachable connection or an integral connection; or may mean a direct connection, or an indirect connection by means of an intermediary. For those of ordinary skill in the art, specific meanings of the foregoing terms in the present application may be understood in specific circumstances.

In the new energy field, a traction battery may be used as a main power source for a power consuming apparatus (such as a vehicle, a ship, or a spacecraft), and an energy storage battery may be used as a charging source for the power consuming apparatus. The importance of both is self-evident. As an example, without a limitation, in some application scenarios, the traction battery may be a battery in the power consuming apparatus, and the energy storage battery may be a battery in a charging apparatus. For ease of description, both the traction battery and the energy storage battery may be collectively referred to as a battery below.

At present, most of the batteries on the market are rechargeable batteries, with most commonly lithium batteries, such as lithium ion batteries or lithium ion polymer batteries. However, during charging of a battery, a charging power of the battery is affected by an external ambient temperature. When the temperature is excessively low, the charging power thereof will be reduced, and the charging of the battery may even be terminated. To resolve this problem, battery heating techniques have been proposed.

In the related art, a battery is usually connected to a heating film to form a heating circuit, and the heating film is further attached to a surface of a cell inside a battery pack. The heating film generates heat by means of switching on the heating circuit and then transfers the heat to the cell. In this way, battery heating is implemented.

However, the inventors of the present application have found that the heating technique of attaching the heating film to the surface of the cell is essentially an external heating solution. This external heating solution involves losses during heat transfer, which thus slows down the battery heating rate and results in a high heat loss. In addition, due to the high heat loss, a large amount of battery power is consumed for self-heating. Therefore, the external heating solution also leads to a long battery charging time and a short battery life when an external ambient temperature is low.

To resolve the above technical problem, the present application proposes a self-heating control circuit and system. When a cell temperature of a battery pack is lower than a threshold, a first switch module is triggered to cut off a charging and discharging circuit of a first battery pack, so that a path is formed between an excitation module and two battery packs. In this case, the excitation module generates an excitation current, so that the excitation current flows back and forth between the two battery packs.

In this way, when the cell temperature is lower than the threshold, there is current flow between the two battery packs, so that heat is generated inside the battery packs, thereby implementing self-heating. Compared with a traditional external heating method for heat transfer, the self-heating method consumes low energy for heating, and therefore, a battery heating method with low energy consumed for heating is provided.

The internal self-heating method requires low energy, and thus also reduces the impact of a battery heating technique on a charging time and a battery life. Under a same temperature condition, the battery self-heating solution has an improved battery life and a shorter charging time compared with the related art, and requires no improvement in the interior of the battery packs, thereby reducing costs, and being simple and convenient to operate.

It should be noted that the self-heating control circuit mentioned above may be connected to a battery and then mounted in a power consuming apparatus. The power consuming apparatus may be, but is not limited to, a mobile phone, a tablet, a notebook computer, an electric toy, a power tool, a battery car, an electric car, a ship, a spacecraft, etc.

Referring to FIG. 1, in some embodiments, the self-heating control circuit may include a control module 11, a first switch module 12 and an excitation module 13.

The control module 11 may be configured to obtain a cell temperature of each of two battery packs connected in parallel, and send a trigger signal when the cell temperature is lower than a threshold.

The above-mentioned control module 11 may be a battery management system (BMS) of the battery pack, or when the power consuming apparatus is a vehicle, the control module 11 may also be a vehicle control unit (VCU) of the vehicle in which the battery pack is located. The control module 11 may also be an independent control chip, which control chip may be connected to a BMS or a temperature sensor in the battery pack, so that the cell temperature may be obtained through the correspondingly connected BMS or temperature sensor. This is not specifically limited in the present application.

The above-mentioned control module 11 may also be composed of a VCU and a control unit that may send the trigger signal, or a BMS and the control unit. Correspondingly, the VCU/BMS determines whether the cell temperature is lower than the threshold. When the cell temperature is lower than the threshold, an electrical signal is sent to the control unit, so that the control unit sends the trigger signal to the first switch module 12.

The above-mentioned threshold may be determined according to a temperature range corresponding to an optimal charging power of the cell in the battery pack, or the above-mentioned threshold may be set according to a critical temperature value at which a charging operation cannot be performed for the cell.

Illustratively, if the temperature range corresponding to the optimal charging power is [a, b], the threshold may be set as a.

Illustratively, if the critical temperature value is c degrees Celsius, the threshold may be set as c degrees Celsius. Certainly, the threshold may also fluctuate up and down in a certain range of c.

It should also be noted that, in the solution of the present application, the cell temperature and the comparison between the cell temperature and the threshold are mainly designed through a structure of connecting the control module 11 and related hardware. A software implementation process that may be involved has not changed in the present application, and may be designed with reference to related art in this field.

It is possible that the trigger signal is sent when a cell temperature of one battery pack is lower than the threshold.

It is also possible that the trigger signal is sent when cell temperatures of both battery packs are lower than the threshold.

The first switch module 12 is disposed at a charging and discharging circuit of a first battery pack 21, and a control terminal of the first switch module 12 is connected to the control module 11. The first switch module 12 may be switched off upon reception of the trigger signal, thereby cutting off the charging and discharging circuit, and the two battery packs include the above-mentioned first battery pack 21.

The excitation module 13 may be configured to form a path with the two battery packs upon cut-off of the charging and discharging circuit, and generate an excitation current, so that the excitation current flows back and forth between the two battery packs.

In the embodiments of the present application, when the cell temperature of the battery pack is lower than the threshold, the first switch module 12 is triggered to cut off the charging and discharging circuit of the first battery pack 21, so that a path is formed between the excitation module 13 and the two battery packs. In this case, the excitation module 13 generates an excitation current, so that the excitation current flows back and forth between the two battery packs. In this way, when the cell temperature is lower than the threshold, there is current flow between the two battery packs, so that heat is generated in the battery packs, thereby implementing self-heating. Compared with a traditional external heating method for heat transfer, the self-heating method consumes low energy for heating, and therefore, a battery heating method with low energy consumed for heating is provided.

The internal self-heating method requires low energy, and thus also reduces the impact of a battery heating technique on a charging time and a battery life. Under a same temperature condition, the battery self-heating solution has an improved battery life and a shorter charging time compared with the related art, and requires no improvement in the interior of the battery packs, thereby reducing costs, and being simple and convenient to operate.

Specifically, in this embodiment, when the first switch module 12 does not receive the trigger signal, the two battery packs may jointly serve as a traction battery to supply power to the power consuming apparatus, or may receive a charging signal from the charging apparatus for charging. That is to say, in the case of a normal cell temperature, the two battery packs form a circuit with the power consuming apparatus or the charging apparatus. This circuit is used in both charging and discharging stages of the battery, also referred to as the charging and discharging circuit.

When the first switch module 12 receives the trigger signal sent by the control module 11, this indicates that the temperature of the cells in the battery pack is excessively low, and heating of the battery pack is needed. Therefore, the first switch module 12 is switched off, such that the charging and discharging circuit of the first battery pack 21 is cut off, and the excitation module 13 is then turned from a state of being not connected to a circuit to a state of forming the path with the two battery packs.

When the excitation module 13 forms the path with the two battery packs, an excitation current is generated inside the excitation module, which can flow back and forth between the two battery packs. In this case, the cells of the battery pack are subjected to self-heating due to the flow of current inside the battery pack, which causes a phenomenon of self-heating of the battery in a low temperature environment. Compared with the external heating method in which the heating film is attached, the cell self-heating due to the internal current flow allows for significant reduction in heat loss, requires no change in the internal structure of the battery pack, has a high heating efficiency of the battery pack, and presents a good compatibility performance.

Figure 2:
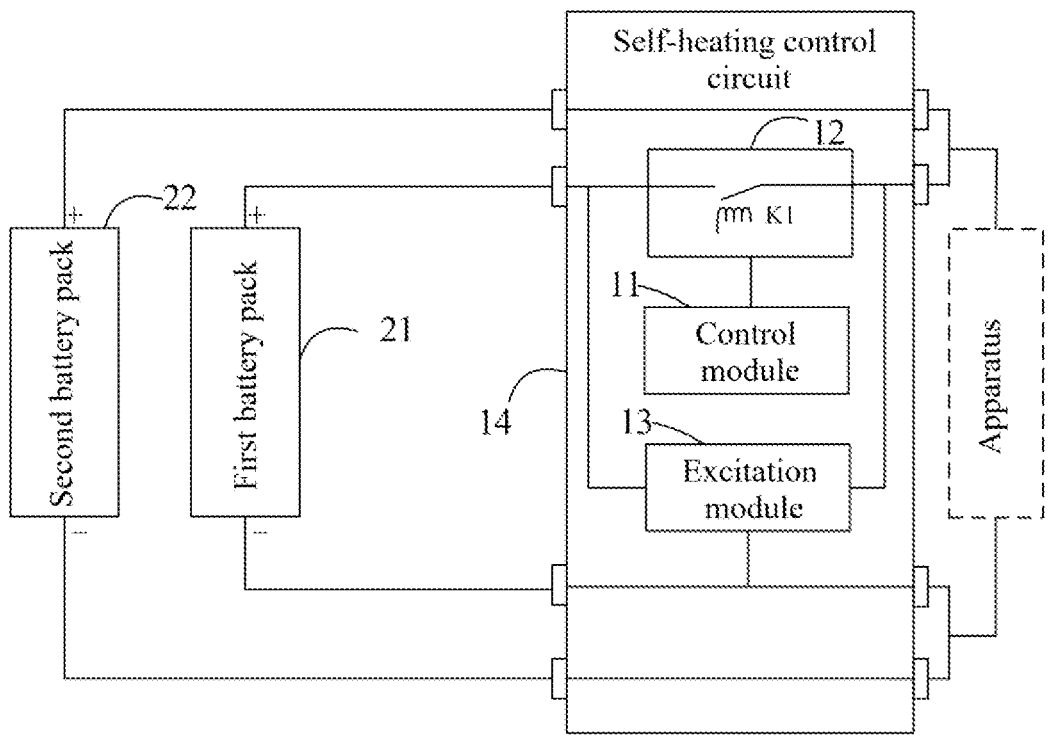
FIG. 2 is a schematic diagram of a circuit structure of a self-heating control circuit according to an embodiment of the present application.

Referring to both FIGS. 1 and 2, it should be noted that, the two battery packs include another battery pack, namely a second battery pack 22, in addition to the first battery pack 21. Based on the foregoing structure, in an optional example, the first switch module 12 may include a first relay K1. Alternatively, the first switch module 12 may also be some compound switches, which are, for example, formed by connecting a plurality of MOS transistors in parallel.

The first relay K1 is used as an example for description, and other connection relationships of the first switch module 12 may also be set by reference. A first terminal of the first relay K1 may be connected to a first pole of the first battery pack 21, a second terminal of the first relay K1 may be connected to a first pole of the second battery pack 22, and a control terminal of the first relay K1 may be connected to the control module 11.

The above-mentioned first relay K1 may be a normally closed relay, and the first terminal and the second terminal thereof are two normally closed contacts of the first relay K1. When no signal is received from the control terminal, a normally closed state is maintained, and the charging and discharging circuit of the first battery pack 21 may then function properly.

When the trigger signal is received from the control terminal, the normally closed contacts are opened, and the normally closed state of the first relay K1 is turned to an open state, such that the charging and discharging circuit of the first battery pack 21 is cut off, and the first battery pack 21 cannot continue charging/discharging, but enter a self-heating state through the excitation module 13.

The provision of the first relay K1 provides an optional structure of the first switch module 12, which facilitates changing the state of the charging and discharging circuit in a timely manner in the case of an excessively low temperature of the cell 23, in preparation for the excitation module 13 to promote self-heating of the battery packs.

Still referring to FIGS. 1 and 2, in another optional example, on the basis of setting the first relay K1, a first terminal of the excitation module 13 may be connected to the first terminal of the first relay K1, a second terminal of the excitation module 13 may be connected to the second terminal of the first relay K1, and a third terminal of the excitation module 13 may be connected to a second pole of the first battery pack 21.

Figure 3:
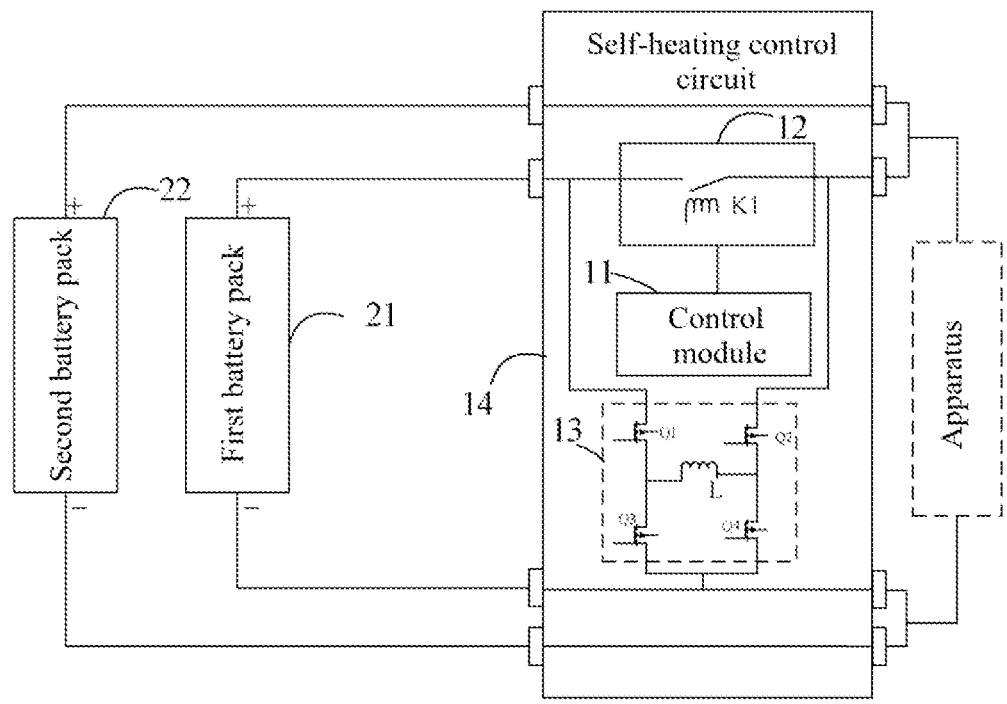
FIG. 3 is a schematic diagram of another circuit structure of a self-heating control circuit according to an embodiment of the present application.

It should be noted that, in FIGS. 1 to 3 of the present application, an example in which the first pole of the first battery pack 21 and the first pole of the second battery pack 22 are both positive poles and the second poles thereof are both negative poles is used for illustration. The first pole of the first battery pack 21 and the first pole of the second battery pack 22 may also be negative poles, and the corresponding second poles thereof may be positive poles.

Referring to FIG. 2, after the first relay K1 is switched on, the first battery pack 21 forms a path from the positive pole of the first battery pack 21, the first terminal of the excitation module 13, the third terminal of the excitation module 13 to the negative pole of the first battery pack 21; and the second battery pack 22 forms a path from the positive pole of the second battery pack 22, the second terminal of the excitation module 13, the third terminal of the excitation module 13, a negative common terminal at which the second battery pack 22 is connected to the first battery pack 21 to the negative pole of the second battery pack 22.

In these examples, a connecting structure of coordinating the first relay K1 with the excitation module 13 shows how the two battery packs connected in parallel are turned from a normal charging and discharging state to a state of forming the path with the excitation module 13, which provides a hardware basis for the excitation module 13 to promote self-heating of the battery packs.

Still referring to FIGS. 1 and 3, FIG. 3 shows a schematic structural diagram of the self-heating control circuit according to another embodiment. The excitation module 13 may include an energy storage unit L, a first switching unit Q1, a second switching unit Q2, a third switching unit Q3 and a fourth switching unit Q4.

The first switching unit Q1 may be connected to the first pole of the first battery pack 21, the second switching unit Q2 may be connected to the first pole of the second battery pack 22, the third switching unit Q3 may be connected to the second pole of the first battery pack 21, and the fourth switching unit Q4 may be connected to the second pole of the first battery pack 21.

A common terminal of the first switching unit Q1 and the third switching unit Q3 and a common terminal of the second switching unit Q2 and the fourth switching unit Q4 may be further connected to the energy storage unit L.

Control terminals of the first switching unit Q1, the second switching unit Q2, the third switching unit Q3 and the fourth switching unit Q4 are all connected to the control module 11, and ON timings of the first switching unit Q1 and the fourth switching unit Q4 are not the same as ON timings of the second switching unit Q2 and the third switching unit Q3.

Figure 6:
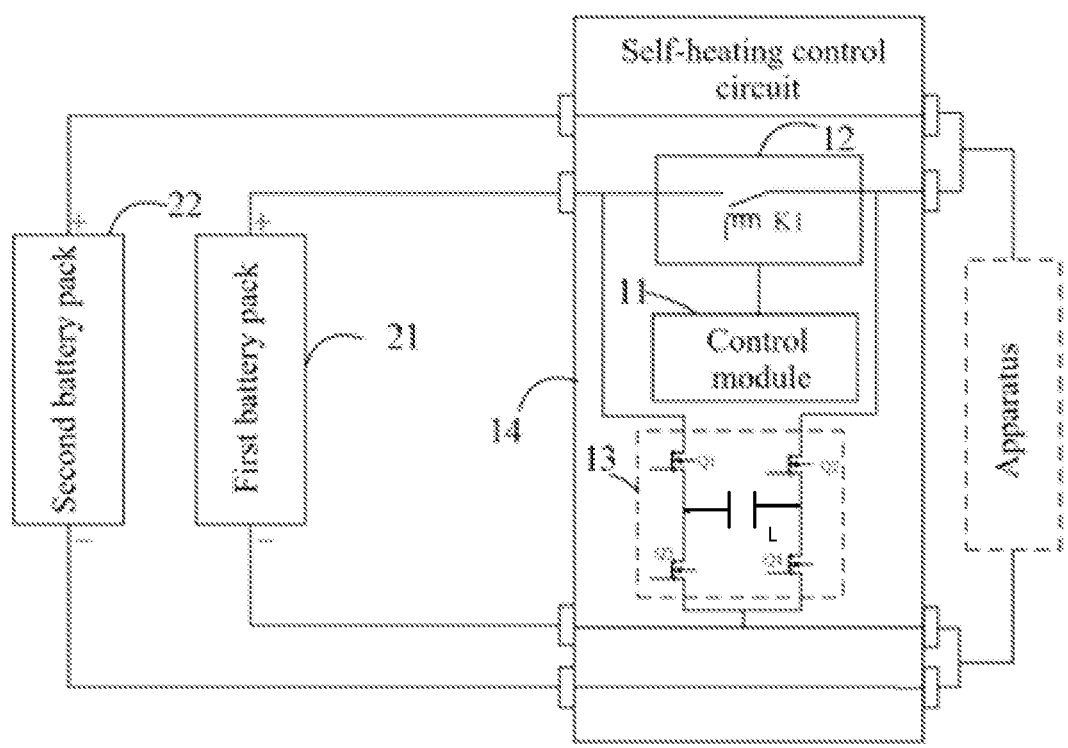
FIG. 6 is a schematic diagram of a circuit structure of a self-heating control system according to an embodiment of the present application.

It should be noted that the above-mentioned energy storage unit L may be an energy storage element such as an inductor as shown in FIG. 3 or a capacitor as shown in FIG. 6.

The first switching unit Q1, the second switching unit Q2, the third switching unit Q3 and the fourth switching unit Q4 may be set, according to actual needs, as MOS transistors such as PMOS transistors, or insulated gate bipolar transistors (IGBT), or a combination of triodes and diodes, or other integrated switch chips, as long as ON/OFF switching in this embodiment may be implemented, and a path can be formed between the excitation module 13 and the battery packs to implement current excitation.

Figure 5:
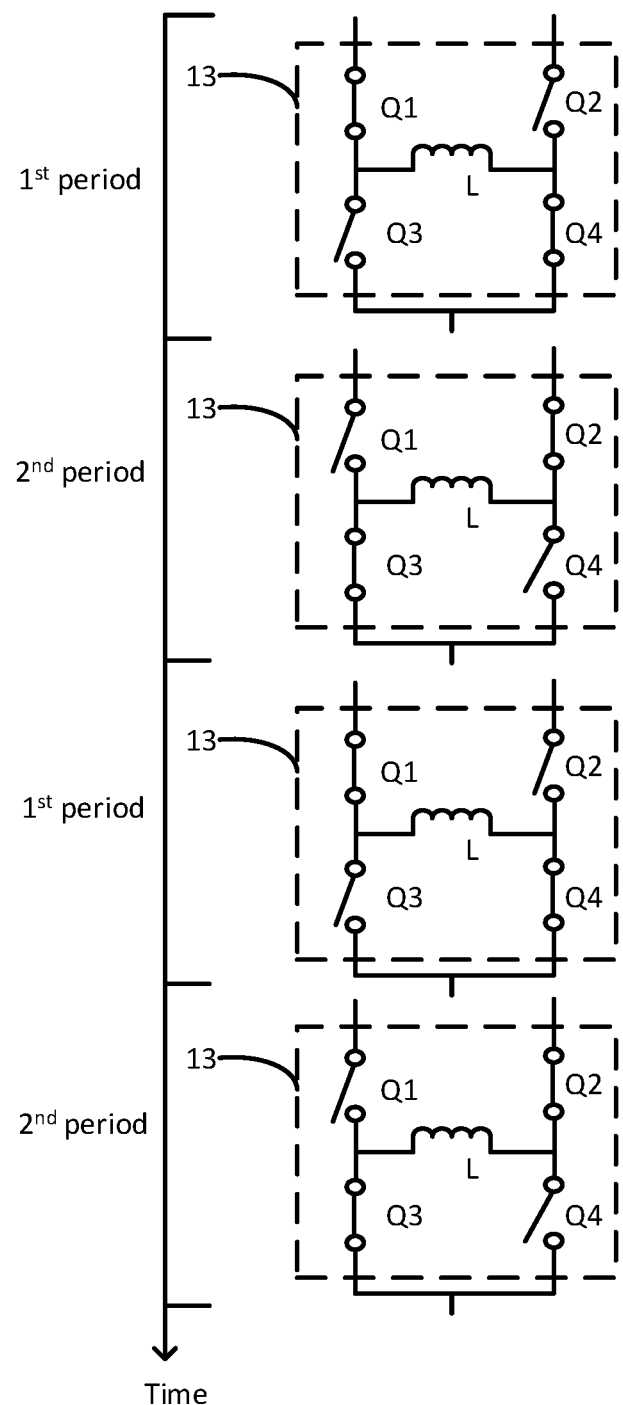
FIG. 5 is a schematic diagram of a circuit structure of a self-heating control system according to an embodiment of the present application.

In this embodiment, as shown in FIG. 5, the first switching unit Q1, the fourth switching unit Q4 and the energy storage unit L are connected onto a path in which the first battery pack 21 is located, and the second switching unit Q2, the third switching unit Q3 and the energy storage unit L are connected onto a path in which the second battery pack 22 is located. Because the ON timings of the first switching unit Q1 and the fourth switching unit Q4 are different from the ON timings of the second switching unit Q2 and the third switching unit Q3, the first switching unit Q1 and the fourth switching unit Q4, and the second switching unit Q2 and the third switching unit Q3 may be controlled according to the timings, to implement periodical switch between ON and OFF states. In other words, in a first period, the first switching unit Q1 and the fourth switching unit Q4 are switched on, while the second switching unit Q2 and the third switching unit Q3 are switched off; and in a second period, the first switching unit Q1 and the fourth switching unit Q4 are switched off, while the second switching unit Q2 and the third switching unit Q3 are switched on. The first period alternates with the second period, so that the energy storage unit L is continuously charged and discharged. A direction of current in the path between the excitation module 13 and the two battery packs is constantly changing, and the current flows back and forth between the two battery packs, thereby enabling self-heating of the cells in the battery packs, and thus implementing the self-heating of the battery packs in a low temperature environment.

In this embodiment, the structural composition of the excitation module 13 is provided, and in conjunction with the timing control of the four switching units by the control module 11, an oscillating excitation current is generated inside the excitation module 13. The excitation module is simple in structure, facilitates implementing self-heating of the battery packs with significantly reduced heat loss, has a high heating efficiency of the battery pack, and presents a good compatibility performance without the need to change the internal structure of the battery pack.

Still referring to FIGS. 1 to 3, in addition to the above structure, the circuit further includes a first housing 14 in another embodiment of the self-heating control circuit, and the control module 11, the first switch module 12 and the excitation module 13 may be accommodated in the first housing 14. The provision of the first housing 14 can prevent the internal circuit from suffering external interference and facilitate circuit integration.

On this basis, the first housing 14 may also be provided with eight high voltage interfaces. In FIG. 3, four interfaces on the left of the housing may facilitate connection with the battery packs, and four interfaces on the right may facilitate connection of the positive and negative poles of the battery packs to the outside, namely, to the power consuming apparatus such as a motor or an air conditioner or to the charging apparatus such as a charging pile.

The four interfaces on the left are respectively a first positive interface 41, a second positive interface 42, a first negative interface 43, and a second negative interface 44, which are correspondingly connected to the positive pole of the second battery pack 22, the positive pole of the first battery pack 21, the negative pole of the first battery pack 21, and the negative pole of the second battery pack 22.

The four interfaces on the right are respectively a third positive interface 45, a fourth positive interface 46, a third negative interface 47, and a fourth negative interface 48.

Inside the first housing 14, the first positive interface 41 may be connected to the third positive interface 45 by means of a high-voltage wire harness, and the second positive interface 42 is connected to the first relay K1 by means of a high-voltage wire harness, and then to the outside through the fourth positive interface 46.

The first negative interface 43 is then connected to the third negative interface 47 by means of a high-voltage wire harness, and the second negative interface 44 is connected to the fourth negative interface 48 by means of a high-voltage wire harness. The third terminal of the excitation module 13 may be connected to the first negative interface 43 and the third negative interface 47.

It should also be noted that, when the path is formed between the two battery packs and the excitation module 13, the four interfaces on the right may be the third positive interface 45 and the fourth positive interface 46 that are connected to each other, and the third negative interface 47 and the fourth negative interface 48 that are connected to each other. Furthermore, the four interfaces on the right are all disconnected from the power consuming apparatus and the charging apparatus, thereby ensuring that the battery packs are not in high-voltage connection with the outside when the battery is subjected to self-heating.

The provision of the first housing 14 and the interfaces allows for both the interfaces for the battery packs and the high-voltage wiring harnesses to be multiplexed, and the self-heating control circuit to be quickly connected to the battery packs, without affecting normal power supply or discharge of the battery packs, thereby facilitating rapid switching.

The self-heating control circuit according to the embodiments of the present application is described in detail above with reference to FIGS. 1 to 3. On this basis, an embodiment of the present application further provides a self-heating control system. The system includes two battery packs and a self-heating control circuit provided in the above-mentioned embodiments. Therefore, the self-heating control system has all the beneficial effects of the above-mentioned self-heating control circuit.

Figure 4:
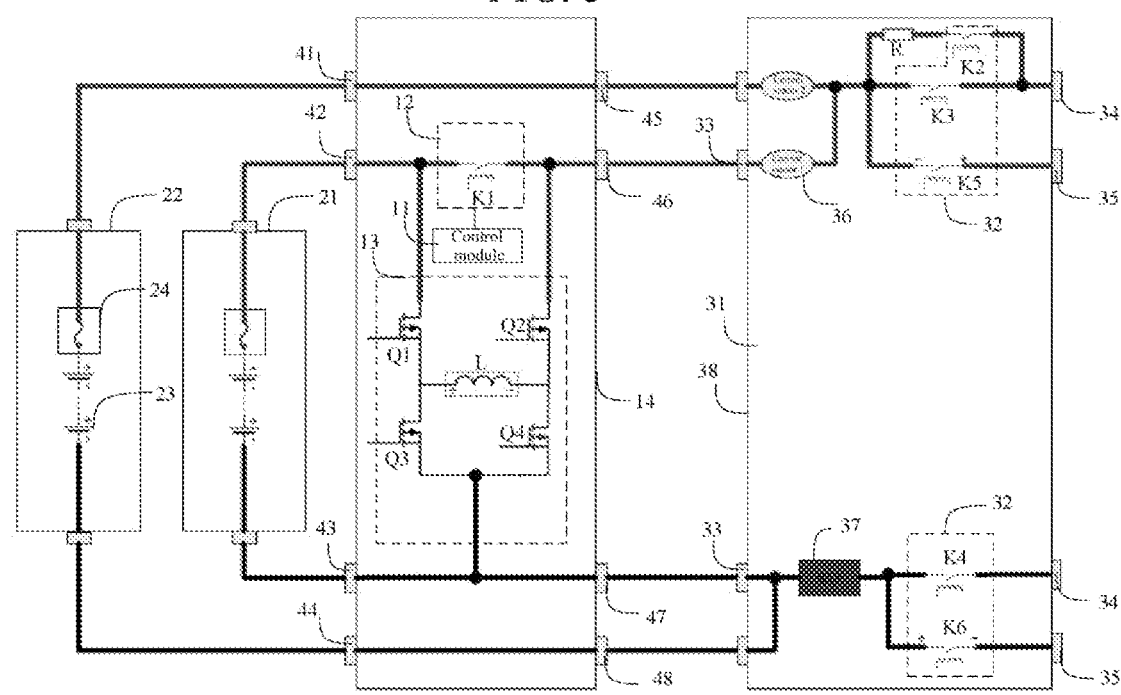
FIG. 4 is a schematic diagram of a circuit structure of a self-heating control system according to an embodiment of the present application.

Referring to FIG. 4, based on the above structure, another embodiment of the self-heating control system of the present application is proposed. In this embodiment, each of the above-mentioned battery packs may include a plurality of cells 23 connected in series and a first service switch 24 connected in series between the cells 23. The first service switch 24 may be placed at any position between a positive pole of one battery pack and a negative pole of another battery pack. Therefore, a high-voltage main circuit of one battery pack may be manually cut off, thereby implementing independent operation of another battery pack. The provision of the first service switch 24 can provide safety protection for maintenance personnel.

In another embodiment, still referring to FIG. 4, in addition to the above structure, the self-heating control system further includes a high voltage control circuit 31, in order to provide a stable high-voltage system for the battery pack.

The high voltage control circuit 31 may include a second switch module 32, a first interface 33, a power supply interface 34, and a charging interface 35. The second switch module 32 is connected to a common terminal of the two battery packs via the first interface 33, to a power consuming apparatus via the power supply interface 34, and to a charging apparatus via the charging interface 35. The power consuming apparatus and the charging apparatus are not shown in the figure.

The second switch module 32 may be configured to control a discharging circuit to be formed between the two battery packs and the power consuming apparatus upon reception of a power supply signal via the power supply interface 34.

The second switch module 32 may be further configured to control a charging circuit to be formed between the two battery packs to form a charging circuit with the charging apparatus upon reception of a charging signal via the charging interface 35.

The second switch module 32 may be further configured to control the charging circuit and the discharging circuit to be switched off upon reception of a trigger signal.

The above-mentioned second switch module 32 may be provided in a second housing 38. The second housing 38 is provided with a notch, and has the first interface 33, the power supply interface 34 and the charging interface 35 provided thereon. The accommodation design of the second housing 38 facilitates switching of a high voltage control circuit, and ensures electricity safety.

There may be four first interfaces 33, and the four first interfaces 33 are respectively connected to the third positive interface 45, the fourth positive interface 46, the third negative interface 47, and the fourth negative interface 48.

There may be two power supply interfaces 34, which are respectively connected to positive and negative poles of the power consuming apparatus. There may also be two charging interfaces 35, which are respectively connected to positive and negative poles of a direct-current charging apparatus.

It should also be noted that the two first interfaces 33 respectively connected to the third positive interface 45 and the fourth positive interface 46 may also be connected to each other inside the second housing 38 by means of a high-voltage wire harness, so that the positive poles of the two battery packs are connected to form a positive common terminal of the battery packs. The same is true of the formation of a negative common terminal of the battery packs, and details are not repeated herein again.

The high voltage control circuit 31 may further include two current sensors 36. The two current sensors 36 may be respectively connected to the positive charging and discharging circuits of the first battery pack 21 and the second battery pack 22, thereby implementing current detection at a high voltage, and thus preventing elements in the circuit from being damaged due to an excessive current at the moment of startup.

In this embodiment, the second switch module 32 can be used to receive different signals, namely, the power supply signal, the charging signal, and the trigger signal, and ON/OFF control can be used to allow for switching-on of the circuit between the battery packs and a different apparatus/module, thereby implementing high-voltage power transfer.

Still referring to FIG. 4, the above-mentioned second switch module 32 may include a second relay K2, a third relay K3, a fourth relay K4, a fifth relay K5 and a sixth relay K6. The second relay K2 is also connected in series to a pre-charging component R to form a branch, where the pre-charging component R may be, for example, a pre-charging resistor, and the branch formed by series connection is connected in parallel to the third relay K3.

A first terminal of the third relay K3 is connected to the positive common terminal of the two battery packs, and a second terminal of the third relay is connected to the positive pole of the power consuming apparatus via the power supply interface 34. A first terminal of the fourth relay K4 is connected to the negative common terminal of the two battery packs, and a second terminal of the fourth relay is connected to the negative pole of the power consuming device via the power supply interface 34.

A first terminal of the fifth relay K5 is connected to the positive common terminal of the two battery packs, and a second terminal of the fifth relay is connected to the positive pole of the direct-current charging apparatus via the charging interface 35. A first terminal of the sixth relay K6 is connected to the negative common terminal of the two battery packs, and a second terminal of the sixth relay is connected to the negative pole of the direct-current charging apparatus via the charging interface 35.

It should be noted that, in an initial stage of the two battery packs performing discharging to the power consuming apparatus, the second relay K2 and the fourth relay K4 are switched on. The second relay K2 is switched off after being switched on for a period of time, and the third relay K3 is switched on. In this way, the series connection of the pre-charging resistor makes it possible to prevent the power consuming apparatus from being damaged due to an excessive transient current, thereby improving electricity safety.

Except for at the moment of startup, an ON/OFF state of the third relay K3 may be the same as that of the fourth relay K4, and whether the discharging circuit is switched on may be determined by adjusting the ON/OFF state of the third relay K3 and the fourth relay K4. An ON/OFF state of the fifth relay K5 may also be the same as that of the sixth relay K6, and whether the charging circuit is switched on may be determined by adjusting the ON/OFF state of the fifth relay K5 and the sixth relay K6.

In addition, when the temperature of the cells 23 is lower than a threshold, the second relay K2 to the sixth relay K6 are all switched off, so that both the charging circuit and the discharging circuit are in an OFF state, thereby ensuring that the battery packs are not in high-voltage connection with the outside when being subjected to self-heating.

It should also be noted that the above-mentioned high voltage control circuit 31 further includes a second service switch 37. The second service switch 37 is connected to the negative common terminal of the battery packs, and also to a common terminal of the fourth relay K4 and the fifth relay K5. It should be noted that both the first service switch 24 and the second service switch 37 may be manual service disconnectors. The provision of the second service switch 37 facilitates disconnection of the second service switch 37 when a high voltage system fails, and thus provides protection for maintenance personnel.

Although the present application is described with reference to some embodiments, various improvements may be made thereto, and the components thereof may be replaced with equivalents, without departing from the scope of the present application. In particular, as long as there is no structural conflict, each technical feature mentioned in each embodiment can be combined in any manner. The present application is not limited to specific embodiments disclosed herein, but includes all technical solutions that fall within the scope of the claims.

What is claimed is:

1. A self-heating control circuit, comprising:
a control module configured to obtain a cell temperature of each of two battery packs connected in parallel, and send a trigger signal in response to the cell temperature being lower than a threshold, the two battery packs comprising a first battery pack and a second battery pack;
a switch module disposed at a charging and discharging circuit of the first battery pack, wherein a control terminal of the switch module is connected to the control module and is configured to cut off the charging and discharging circuit upon reception of the trigger signal;
an excitation module configured to form a path with the two battery packs upon cut-off of the charging and discharging circuit, and generate an excitation current, so that the excitation current flows back and forth between the two battery packs; and
a housing, the control module, the switch module, and the excitation module being accommodated in the housing;
wherein:
the housing is provided with a plurality of interfaces, the plurality of interfaces comprising a first positive interface, a second positive interface, a first negative interface, and a second negative interface arranged in an order on a left side of the housing, and a third positive interface, a fourth positive interface, a third negative interface, and a fourth negative interface arranged in an order on a right side of the housing;
the first positive interface, the second positive interface, the first negative interface, and the second negative interface are connected to a positive pole of the second battery pack, a positive pole of the first battery pack, a negative pole of the first battery pack, and a negative pole of the second battery pack, respectively;
inside the housing, the first positive interface is connected to the third positive interface, the second positive interface is connected to the switch module, the first negative interface is connected to the third negative interface, and the second negative interface is connected to the fourth negative interface;
a terminal of the excitation module is connected to the first negative interface and the third negative interface; and
the third positive interface and the fourth positive interface are connected to each other, and the third negative interface and the fourth negative interface are connected to each other.

2. The self-heating control circuit according to claim 1, wherein:
the switch module comprises a relay;
a first terminal of the relay is connected to a pole of the first battery pack, and a second terminal of the relay is connected to a pole of the second battery pack; and
the control terminal of the switch module is a control terminal of the relay that is connected to the control module and configured to cut off the charging and discharging circuit upon reception of the trigger signal.

3. The self-heating control circuit according to claim 2, wherein:
the pole of the first battery pack is a first pole of the first battery pack; and
a first terminal of the excitation module is connected to the first terminal of the relay, a second terminal of the excitation module is connected to the second terminal of the relay, and a third terminal of the excitation module is connected to a second pole of the first battery pack.

4. The self-heating control circuit according to claim 2, wherein:
the pole of the first battery pack is a first pole of the first battery pack;
the excitation module comprises an energy storage unit, a first switching unit connected to the first pole of the first battery pack, a second switching unit connected to the pole of the second battery pack, and a third switching unit and a fourth switching unit that are both connected to a second pole of the first battery pack;
the energy storage unit is connected to a common terminal of the first switching unit and the third switching unit and to a common terminal of the second switching unit and the fourth switching unit; and
control terminals of the first switching unit, the second switching unit, the third switching unit, and the fourth switching unit are all connected to the control module, and ON timings of the first switching unit and the fourth switching unit are different from ON timings of the second switching unit and the third switching unit.

5. The self-heating control circuit according to claim 4, wherein:
the first switching unit and the fourth switching unit are configured to be switched on in a first period and be switched off in a second period;
the second switching unit and the third switching unit are configured to be switched off in the first period and be switched on in the second period; and
the first period alternates with the second period.

6. The self-heating control circuit according to claim 4, wherein the energy storage unit is an inductor or a capacitor.

7. The self-heating control circuit according to claim 4, wherein at least one of the first switching unit, the second switching unit, the third switching unit, or the fourth switching unit is a switch, and the switch is one of an MOS transistor and an insulated gate bipolar transistor.

8. A self-heating control system, comprising:
two battery packs connected in parallel, the two battery packs comprising a first battery pack and a second battery pack; and
a self-heating control circuit comprising:
a control module configured to obtain a cell temperature of each of the two battery packs, and send a trigger signal in response to the cell temperature being lower than a threshold;
a switch module disposed at a charging and discharging circuit of the first battery pack, wherein a control terminal of the switch module is connected to the control module and is configured to cut off the charging and discharging circuit upon reception of the trigger signal;
an excitation module configured to form a path with the two battery packs upon cut-off of the charging and discharging circuit, and generate an excitation current, so that the excitation current flows back and forth between the two battery packs; and
a housing, the control module, the switch module, and the excitation module being accommodated in the housing;
wherein:
the housing is provided with a plurality of interfaces, the plurality of interfaces comprising a first positive interface, a second positive interface, a first negative interface, and a second negative interface arranged in an order on a left side of the housing, and a third positive interface, a fourth positive interface, a third negative interface, and a fourth negative interface arranged in an order on a right side of the housing;
the first positive interface, the second positive interface, the first negative interface, and the second negative interface are connected to a positive pole of the second battery pack, a positive pole of the first battery pack, a negative pole of the first battery pack, and a negative pole of the second battery pack, respectively;
inside the housing, the first positive interface is connected to the third positive interface, the second positive interface is connected to the switch module, the first negative interface is connected to the third negative interface, and the second negative interface is connected to the fourth negative interface;
a terminal of the excitation module is connected to the first negative interface and the third negative interface; and
the third positive interface and the fourth positive interface are connected to each other, and the third negative interface and the fourth negative interface are connected to each other.

9. The system according to claim 8, wherein each of the two battery packs comprises a plurality of cells connected in series and a service switch connected in series with the cells.

10. The system according to claim 8,
wherein the switch module is a first switch module;
the system further comprising:
a high voltage control circuit, comprising a first interface, a power supply interface, a charging interface, and a second switch module;
wherein the second switch module is connected to a common terminal of the two battery packs via the first interface, connected to a power consuming apparatus via the power supply interface, and connected to a charging apparatus via the charging interface.

11. The system according to claim 10, wherein the second switch module is configured to:
control the two battery packs to form a discharging circuit with the power consuming apparatus upon reception of a power supply signal via the power supply interface; and
control the discharging circuit to be switched off upon reception of the trigger signal.

12. The system according to claim 10, wherein the second switch module is configured to:
control the two battery packs to form a charging circuit with the charging apparatus upon reception of a charging signal via the charging interface; and
control the charging circuit to be switched off upon reception of the trigger signal.

* * * * *